United States Patent
Strand et al.

(10) Patent No.: US 6,293,741 B1
(45) Date of Patent: *Sep. 25, 2001

(54) MACHINING OF MMC MATERIAL

(75) Inventors: Kent Strand; Sven-Åke Karlsson, both of Linköping; Stefan Ekblad, Göteborg, all of (SE)

(73) Assignee: Saab AB, Linköping (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/613,838

(22) Filed: Jul. 11, 2000

Related U.S. Application Data

(63) Continuation of application No. 09/207,142, filed on Dec. 8, 1998, now Pat. No. 6,102,635.

(30) Foreign Application Priority Data

Nov. 17, 1998 (SE) .................................................. 9803946

(51) Int. Cl.[7] .................................................. B23C 3/00
(52) U.S. Cl. .............................................. 409/131; 451/28
(58) Field of Search ................................. 409/131, 132, 409/231; 451/28, 51; 208/224; 29/527.2, 527.5, 527.6, 559, 588.046, 889.72, 888.01; 164/97

(56) References Cited

U.S. PATENT DOCUMENTS

| | | | |
|---|---|---|---|
| 4,908,923 | * | 3/1990 | Anderson et al. ................. 29/888.01 |
| 4,955,135 | * | 9/1990 | Pinkhasov ........................... 29/527.2 |
| 5,015,290 | * | 5/1991 | Tiegs et al. .............................. 75/232 |
| 5,344,063 | * | 9/1994 | Johnston et al. ................... 29/889.72 |
| 5,348,431 | * | 9/1994 | Kusunoki et al. .................... 409/132 |
| 5,507,258 | * | 4/1996 | Sasaki .............................. 29/888.046 |
| 5,511,603 | | 4/1996 | Brown et al. . |
| 5,515,346 | * | 5/1996 | Geise .................................... 409/132 |
| 5,518,346 | * | 5/1996 | Geise .................................... 409/132 |
| 5,570,502 | * | 11/1996 | Sawtell et al. ....................... 29/527.6 |
| 5,620,285 | | 4/1997 | Turchan . |
| 5,755,028 | * | 5/1998 | Takami et al. ..................... 29/888.06 |
| 5,758,999 | * | 6/1998 | Geise .................................... 409/231 |
| 5,765,667 | | 6/1998 | Röss et al. . |
| 5,782,324 | * | 7/1998 | Wall .................................... 29/527.5 |
| 5,890,854 | * | 4/1999 | Naumann et al. .................... 409/132 |

OTHER PUBLICATIONS

Iuliano, L. Dr., et al., "High–Speed Turning Of Metal Matrix Composites With Coated And Uncoated Carbide Tools", Crovdon Automotive Automation Ltd., 1997, pp. 445–452.
Duralcan Composites: Machine guidelines, http://www.bricad.com/aluminum/dur/guides/machining/index.html, May 15, 1998.

* cited by examiner

*Primary Examiner*—William Briggs
(74) *Attorney, Agent, or Firm*—Swidler Berlin Shereff Friedman, LLP

(57) ABSTRACT

A component made from a material of metal matrix composite, a so-called MMC material, is manufactured by High Speed Machining, so-called HSM machining, of a workpiece or blank of MMC material to provide a predetermined shape. HSM machining is characterized in that the cutting tool operates at a very high speed in relation to the machined work piece, especially as compared to what is normally the case when using conventional machining techniques.

15 Claims, 1 Drawing Sheet

MACHINING OF MMC MATERIAL

This application is a continuation of Ser. No. 09/207,142 filed Dec. 8, 1998 U.S. Pat. No. 6,102,635.

TECHNICAL FIELD

The present invention relates to a method for machining of work pieces made of MMC material (Metal Matrix Composite) for shaping components such as piston rods, pistons, brake discs and other mechanical components.

BACKGROUND OF INVENTION

Construction materials referred to as MMC materials have become known during the latest decade. The MMC materials are composites formed from a binder material such as aluminum, titanium or alloys from these with a reinforcement by admixture of fibers or particles from substances such as silicon carbide, boron carbide or aluminum oxide. Typically, the reinforcement content is about 15% by weight to about 70% by weight of the MMC material.

MMC materials have very interesting properties, which may be tailored depending upon the field of use, whereby achieving advantages such as making a component lighter, stronger, more rigid and providing the component with better endurance properties than what is possible to achieve by using conventional materials within the specific field of use.

Vehicle technology where fast moving parts, such as piston rods, suitably could be performed by means of these metal composites is an example of a field of use for MMC materials. Vehicle manufacturers constantly try to attain increasing performance with respect to fuel consumption, emissions, vibrations, noise, comfort and the like. Essential with respect to all of these parameters is decreased weight, especially in non-resilient mass and in fast moving engine parts. Especially within competition activities where motor vehicles are used, the above mentioned properties for engine parts are very desirable. Piston rods represent, as mentioned, an example of such components where decreased weight is very favorable.

Within racing activities for vehicles light materials such as aluminum, titanium or coal fiber composites are generally used instead of steal for the mentioned types of components.

Another interesting field of use for MMC products is brake discs for cars, trucks and trains.

One major drawback when using MMC material is that the material has been very hard to machine. When shaping a component employing a MMC material, methods such as casting the component in a mold which closely corresponds to the finally completed shape of the component are applied. Another method is to use a forged work piece or a portion of an extruded rod, whereby spark-machining of the surface of the component and conventional machining may be used to arrive at the final shape of the component. Attempts have been made to produce, by example, piston rods for motor-bikes by using conventional manufacturing machining methods. Hereby, the purpose of arriving at the desired component with its desired properties, such as lower weight, has been achieved. The use of such a piston rod in an engine has given as a result an engine which more willingly moves into a higher gear and further induces lower vibrations to the engine. The problem is, however, that the costs for manu-facturing the engine part are very high, which imply that the use is restricted or limited to fields where the costs are of minor importance.

A number of patent documents disclose different methods for a final stage shaping of components made by MMC materials. U.S. Pat. No. 5,765,667 is here mentioned as one example. This patent describes a method for manufacturing a component, in this example a disc brake, by means of casting the component to a shape which very closely cor-responds to the final shape of the component, in order to, and this is distinctly expressed, as far as possible avoid the need for machining by cutting tools. It is obvious for the person skilled in the art to avoid the need for machining by cutting tools, as the MMC material, when it is composed of an aluminum base and reinforcement in the form of silicon carbide particles contains exactly the composition which is generally used for grinding cutting tools.

The silicon particles embedded in the MMC material have a devastating effect on the cutting tools when machining by the use of conventional machining technique, as the edges of the cutting tools rapidly are worn out by the grinding particles within the composite material.

The present invention discloses an unexpected solution to the above-described problem.

SUMMARY OF INVENTION

One aspect of the invention is based on a method of shaping a work piece of a MMC material by means of what is referred to herein as High Speed Machining (abbreviated HSM) whereby a component can be given its final shape directly from the work piece by means of this machining method. The work piece may be forged, cast, being a piece of an extruded rod or a raw material produced in some other way.

High Speed Machining involves operating the cutting tool at a very high speed in relation to the work piece being machined as compared to the case of conventional machin-ing technique. The cutting tools of current interest are preferably milling tools and drills.

As used herein, the term "high speed machining" (HSM) represents a process which differs from conventional machining methods. It happens that the term is sometimes used to denote also conventional machining, where new methods appear to push the limits for conventional machin-ing to higher levels. However, this is not what is meant here as will be shown below.

HSM machining is characterized by:

very high cutting speeds, high shear strain speed (the ability to separate a chip from the work piece)

a very high effect density is generated in front of the cutting edge (typical value: $MW/mm^3$), at the chip forming process, a very high temperature prevails locally at the cutting place, the chip is flowing without being in contact with the cutting edge, the shearing forces asymptotically approaches zero.

The following are some examples of the high cutting speeds when high speed machining some materials accord-ing to the present invention:

aluminum about 3000 m/min (conventionally about 100–400 m/min), titanium about 15000 m/min (conventionally about 15–100 m/min).

To find the correct cutting speed depends on the kind of material being machined to obtain the above-discussed states held to characterize high speed machining. Such can be determined by persons skilled in the art without undue experimentation once aware of this disclosure.

When testing to determine an optimal cutting speed for an HSM machining of a new material, the shearing forces can be studied. These forces asymptotically approach zero when the criteria for the HSM machining state are attained. Thus, HSM state may be said to prevail when the shearing forces are decreasing with increasing cutting speeds. At said HSM state, the objective is to determine an optimal cutting speed for the machined material. At conventional machining, the shearing forces are increasing with increasing cutting speeds. This means that, as it is now understood, the shearing forces as a function of the cutting speed may be represented by a curve having a global maximum (local maximums or minima may occur). If machining data is such that machining is performed at the increasing side of the curve, conventional machining prevails. On the other hand, HSM state prevails when machining is performed under such conditions that machining is performed at the decreasing side of the curve, or in other words: HSM machining prevails when the global maximum point is past.

Another advantage of using HSM machining is that the chip absorbs the major portion of the heat generated at the cutting point, typically 80%, whereby a work piece is left essentially unaffected by the heat generated at the machining.

It has been discovered that high speed machining gives unexpectedly good results when used for MMC materials. Despite the high portion of grinding substances within the material it appears that the cutting tools maintain their sharpness for a long time, as if they were unaffected by the presence of the grinding substances in the MMC material. The reasons behind this are not quite understood, as the courses inside the material, that is, it is not quite known what is in fact happening with the material at the cutting point in the case of high speed machining the MMC material. One theory is that a chip being cut from the material to a certain extent is brought to a liquid state in a limited space immediately in front of the edge of the cutting tool and that the grinding particles embedded, constituted for example by silicon carbide, boron carbide or aluminum oxide, are carried away by the formed charging without thereby coming into direct contact with the edge of the tool. This would be an explanation as to why the cutting tools retain their sharpness, quite contrary to what applies to conventional machining.

Tests have been performed to produce a piston rod by means of HSM machining of an MMC material. The results have been extremely promising. When the machines have the correct settings with respect to spindle rotation speed, cutting speed, feeding of the tool, etc., the machining results have been good. As an example may be mentioned that the cost for forming a prototype of a piston rod performed in a MMC material to its final shape on one hand by means of conventional methods and on the other hand by means of high speed machining has reduced the cost for manufacturing the piston rod by more than 40 times. By serial production of MMC components according to the invention it is possible to reduce the cost even further.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

BEST AND VARIOUS MODES FOR CARRYING OUT INVENTION

Figure 1:
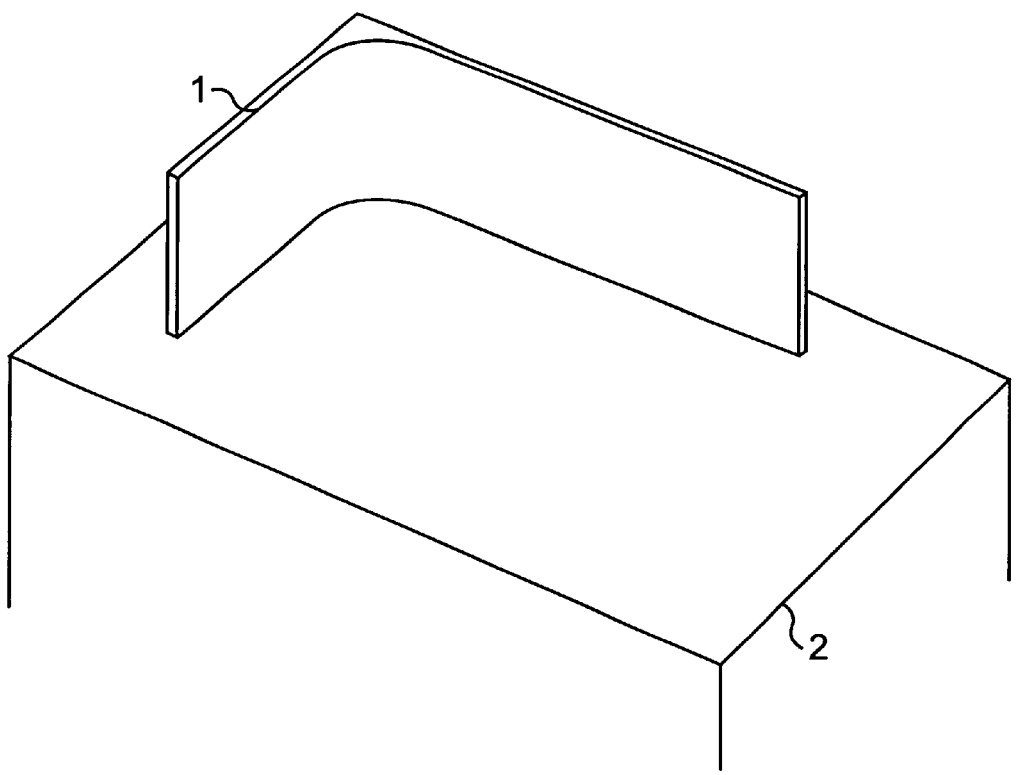
FIG. 1 shows an example of an experimental work, where a piece of a MMC material has been formed by means of high speed machining out of a raw material.

A number of examples of experimental tests to evaluate the method according to the present invention are described by reference to the figures. FIG. 1 shows a flange 1 manufactured from a blank 2 made of a MMC material, where a mill has been used to remove all of the raw material of the blank 2 around the prospective flange 1. The flange 1 has in this case the shape of an L and has a final thickness of material of 1 mm and a length of 45 and 15 mm, respectively for the sides of the L. The settings used for the machining are in this example: spindle speed 15000 rpm, cutting speed 565 m/min and feeding speed 3000 mm/min. The time needed for forming the flange 1 according to FIG. 1 was 2.5 minutes. The worn out time for the cutting tool amounts to hours. The piece according to the figure is made by a MMC material with a portion of 40% Silicon Carbide in the material.

Tests have also been performed by means of drilling in MMC material with a 40 percentage content of SiC. A number of holes with 6.9 mm HM-drills have been made, where the spindle speed amounted to 15000 rpm and the feeding speed to 3000 mm/min. The worn cut time for the drill was in this case such that the drill lasts for use for up to 1000 drill holes.

Figure 2:
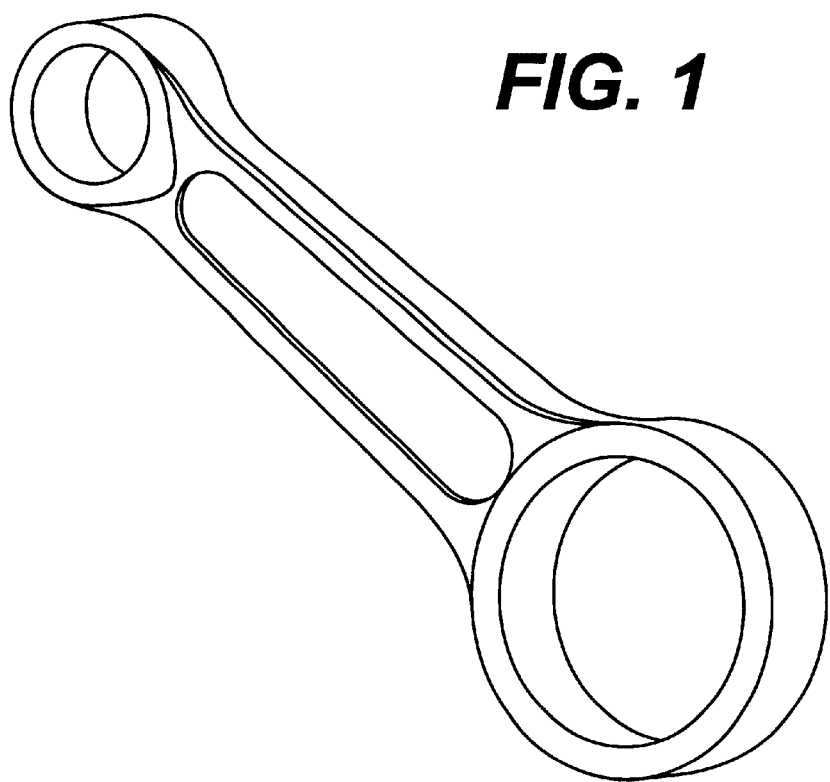
FIG. 2 depicts an example of an engine piece, in this case a piston rod, produced by means of the method according to the present invention.

FIG. 2 discloses an example of a piece for an engine, in this case a piston rod manufactured directly from a blank of MMC material which has been machined to its final shape as a piston rod according to the figure by means of high speed machining according to the invention. The cost for producing a piston rod according to FIG. 2 and made in MMC material is low at the same time as it shows the following advantages compared to piston rods made from other materials:

compared to steel: lower mass,
compared to titanium: lower mass, higher stiffness,
compared to aluminum: higher stiffness, higher yield point, higher endurance limit, coefficient of heat expansion equivalent to the steel of an adjoining crankshaft,
compared to fiber composite: lower price, isotropic properties, coefficient of heat expansion equivalent to the steel of an adjoining crankshaft.

By machining according to the method of the present invention, the good results have been achieved by use of cutting tools made from coated hard metal with interior channel cooling and by use of diamond tools. By use of diamond tools the worn out times for the tools are long up to 40% carbide content of the MMC material. When the carbide content is as high as 70%, good results were still achieved.

The method according to the invention is applicable on all types of components which are to be manufactured from an MMC material, where machining is possible with respect to the final shape of the component. The method is thus not limited to the disclosed examples but may be used for all components, where a choice of MMC is advantageous. Some examples that may be mentioned are engine parts, mechanical structures for spacecrafts, mechanics for instruments, brake discs for vehicles, and the like. Moreover, brake discs fabricated from MMC are advantageous in view of the low weight in comparison with steel, which contribute to decrease the rotational energy stored in the brake discs before a retardation, a condition that has a certain importance on trains, where each wheel shaft often is provided with a number of rotating brake discs made by steel.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for manufacturing a component having a predetermined shape from a metal matrix composite material, the method comprising:

machining with a cutting tool comprising a cutting edge a blank of the metal matrix composite material comprising 15% to 70% reinforcing content by high speed machining in which shearing forces are decreasing with increasing cutting speed, the machining being effective to obtain the predetermined shape of the component.

2. The method of claim 1 wherein the shearing forces as a function of cutting speed asymptotically approach zero.

3. The method of claim 1 wherein the speed of the cutting tool machining the blank at a cutting point relative to the blank is such that a chip formed as a result of the machining locally floats at least momentarily at the cutting point.

4. A method according to claim 1 wherein the cutting tool comprises a member selected from the group consisting of coated hard metal cutting edge, a boron nitride cutting edge and a diamond cutting edge.

5. The method of claim 1 wherein the component is a component for track bound vehicles, trucks or cars.

6. The method of claim 5 wherein the component is a brake disc or brake yoke.

7. The method of claim 1 wherein said reinforcement is at least one member selected from the group consisting of silicon carbide, boron carbide and aluminum oxide.

8. The method of claim 1 wherein said reinforcement is at least one member selected from the group consisting of silicon carbide, boron carbide and aluminum oxide.

9. A method according to claim 1 wherein said reinforcement is a carbide.

10. A method according to claim 1 wherein said reinforcement is a carbide.

11. A method according to claim 1 wherein the MMC comprises at least one base substance selected from the group consisting of aluminum, titanium and alloys thereof.

12. A method according to claim 1 wherein the MMC comprises at least one base substance selected from the group consisting of aluminum, titanium and alloys thereof.

13. The method of claim 1 wherein the component is a component for motor vehicles or for use in optical systems.

14. The method of claim 13 wherein the component is a fast moving engine part.

15. The method of claim 13 wherein the component is a piston rod or crankshaft.

\* \* \* \* \*